Oct. 20, 1953  A. E. KROWS  2,655,833
DISSOLVE TYPE SHUTTER FOR DUAL PROJECTION APPARATUS
Filed Feb. 21, 1950  2 Sheets-Sheet 1
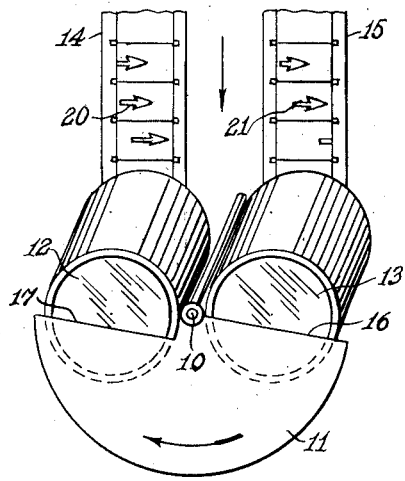
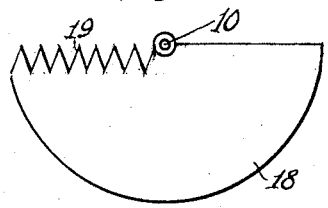
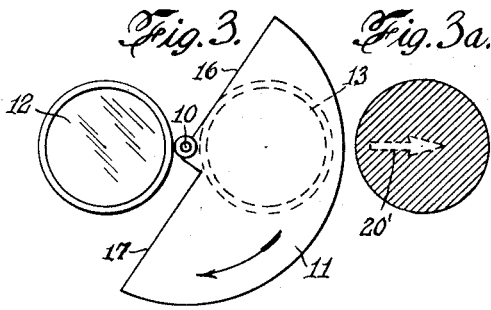
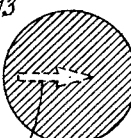
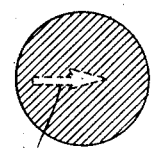
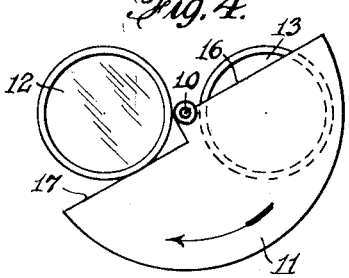
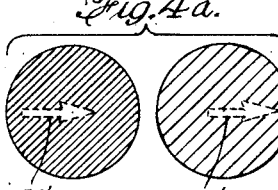
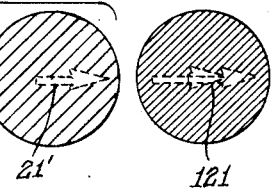
INVENTOR.
ARTHUR E. KROWS
BY
ATTORNEY.

Oct. 20, 1953 A. E. KROWS 2,655,833
DISSOLVE TYPE SHUTTER FOR DUAL PROJECTION APPARATUS
Filed Feb. 21, 1950 2 Sheets-Sheet 2

INVENTOR.
ARTHUR E. KROWS
BY
ATTORNEY.

Patented Oct. 20, 1953

2,655,833

UNITED STATES PATENT OFFICE 2,655,833

DISSOLVE TYPE SHUTTER FOR DUAL PROJECTION APPARATUS

Arthur E. Krows, Hastings-on-Hudson, N. Y.

Application February 21, 1950, Serial No. 145,395

2 Claims. (Cl. 88—19.3)

The invention relates to apparatus for the projection of images of pictures provided on so-called "strip" or "slide" film, and more particularly to apparatus affording dual projection, one projected image dissolving into another and the subject matter of both being related.

As is understood in motion picture projection, 24 frames of individual pictures succeed one another so rapidly (within one second) that, due to persistence of vision, the eye of the observer does not dismiss the impression from one image before the next impression is made on the eye. However, in stereoptican projection dissolve the change from one picture image to the next is so gradual (slow) that the eye of the observer is always abreast of the change, and there is no illusion of motion since the physiological assistance of persistence of vision to intensify the image of the subject fading out is absent. As heretofore conducted, nothing in such projection intensified the departing image. What was within the observer's perception was actually upon the screen as an image, and there was no lingering "after image" effect.

It is an object of the present invention to provide a shutter for dual projection apparatus and suitable for strip or slide film which will bring about in image projection such "after image" or lingering effect of a fading out projected image.

A further object of the invention is to obtain the illusion of motion with the use of strip or slide film projection.

A still further object of the invention is to enhance continuity of still picture dual projection.

The invention has for an object, also, to provide a novel form of shutter which will during the dissolve phase afford a greater effective portion of lens exposure than is possible with the conventional types of shutter used for this purpose, and which shutter accommodates itself more satisfactorily to parallax adjustments between the two projecting systems.

It will be understood that since, in usual dissolve projections, the images progress very slowly, there is no illusion of motion such as prevails in the conventional motion picture projections. With the "still" projection of the dual type a "lap fade" occurs, that is to say, the fade-out of one image overlaps the fade-in of the next-succeeding image, two lengths of film being used, as a rule, in twin projectors, although a single strip may be threaded for both lenses if the pictures be properly located thereon, as is known in the art. As has been the practice heretofore, a rotary shutter common to the two projectors maintains equality between the fade-out and the fade-in phases, each being completed at the same time. In carrying out the present invention, however, the shutter construction is so modified that the fade-out phase is extended to produce an "after-image." The delay must not be too long since "ghost" effects would result on the screen image. A very brief "before-image" would, also, not be objectionable. Moreover, rotation of the shutter does not cut off a composite image on the screen until complete obscuration of one of the optical systems occurs, but rather cuts down the degree of its illumination, the dimming image continuing to appear over the edge of the shutter by refraction until the final fade-out. The effect on the dissolve then is to retain the dimming image somewhat longer and somewhat more intense than is the case with the incoming image.

The novel shutter to this end is of substantially semi-circular shape and of opaque material for cutting off successively the projected images, one of its edges extending radially at one side of the rotational axis of the shutter and the other edge being a straight edge extending at the opposite side and displaced parallel to said radial edge in a direction opposed to that of the shutter rotation.

The nature of the invention, however, will best be understood when described in connection with the accompanying drawings, in which:

Fig. 1 is a view in isometric projection of the novel shutter as associated with a dual projection system indicated by a pair of lenses.

Fig. 2 is an elevational view illustrating a modification in the shutter construction.

Figs. 3, 4, 5, 6 and 7 are views showing different positions in the rotary relationship of shutter to lenses during one-half rotation of the former and involving successive complete obscuration periods of the respective lenses.

Figs. 3a, 4a, 5a, 6a and 7a are diagrammatic representations of image phases as projected from the respective lenses and corresponding to the shutter positions shown in Figs. 3, 4, 5, 6 and 7, respectively.

Figs. 3b, 4b, 5b, 6b and 7b are diagrammatic representations of composite image phases, as projected on a screen, corresponding to the shutter positions shown in Figs. 3, 4, 5, 6 and 7, respectively.

Figure 5:
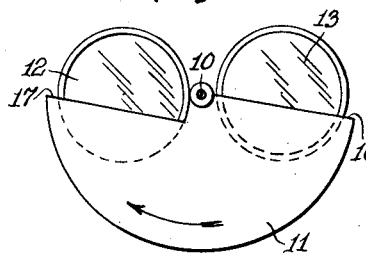
Figure 5A:
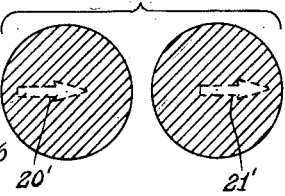
Figure 5B:
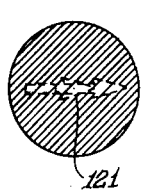

Referring to the drawings, 10 designates a rotatable shaft bearing for rotation therewith, in the direction indicated by the arrow, a shutter 11 of generally semi-circular shape. This shutter is of the conventional opaque material designed to obscure in its rotation successively the two lenses 12 and 13 representative of a dual projection system for projecting images of pictures of respective film strips 14 and 15 which are designed to be advanced past the respective lenses 12 and 13 alternatively and at a selected interval—all of which is well understood and forms no particular part of my invention. The pictures, as indicated, are of related subject matter and those of one film are displaced laterally with respect to those of the companion film.

The invention resides more especially in the particular conformation of the shutter light-cut-off edges and their relation to the lenses. Thus, provision is made whereby the cut-off edge at one side of the shutter shaft 10, or axis of rotation, is displaced to prolong the exposure phase as the shutter passes over the respective lenses. That is to say, while the cut-off edge 16 at one side of the shaft 10 is radial, lying in the diameter of the semi-circular disk 11, the companion cut-off edge 17 at the opposite side of the shaft is likewise a straight edge but is displaced parallel to the said radial edge 16 and in a direction opposite to the direction of rotation of the disk 11, indicated by the arrow. I have found that a displacement of the cut-off edge 17 equal to approximately ¼ the diameter of the lenses with which the shutter is associated affords a satisfactory "after image" effect or lingering of the projected image from the particular lens cooperating with the shutter portion at that time. When the shutter is not positioned closely to the lenses, it is desirable to construct said shutter 18, Fig. 2, with its cut-off edge 19 serrated to break up the sharper definition resulting from its better focus location.

In either case, reference being had to Figs. 3 to 7, inclusive, it will be noted that in the particular rotational phase shown in Fig. 3 the lens 13 is wholly obscured while the lens 12 is free for an image to be projected therethrough, for example the arrow 20 of film 14. There will therefore be but one image 20′ projected and at full illumination—indicated by the closest cross-hatching—and the picture 21 on film 15, which is somewhat displaced laterally though of identical conformation, is not seen at all, so that the screen image 121 will appear the same as the image 20′.

In the next phase where the shutter has progressed sufficiently to expose a small portion of lens 13, the lens 12 still retaining full opening due to the displaced edge 17, in addition to the image 20′ being projected under full illumination, picture 21 appears also as an image 21′ but only faintly. There is then visible on the screen a composite image 121, in which the image 20′ predominates.

In the further stage shown in Fig. 5, the lens openings afforded by the shutter are substantially equal and both images 20′ and 21′ are projected and at substantially like intensities. The composite screen image 121 then is in its most brilliant phase.

Figure 6:
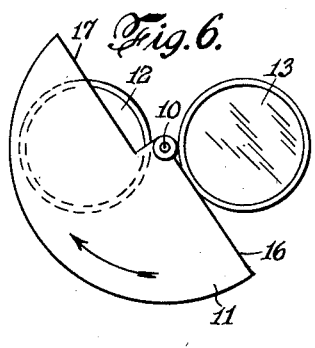
Figure 6A:
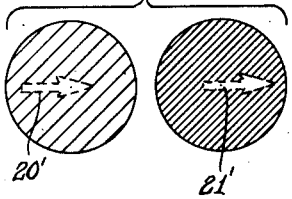
Figure 6B:
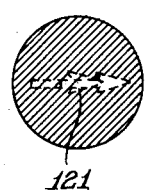

In the next stage the conditions are substantially as shown in Fig. 6 but with the lens obscurations reversed, and the image 21′ thus is the more intensely illuminated one and predominates on the screen image 121.

Figure 7:
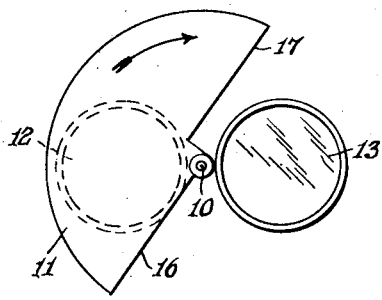
Figures 7A, 7B:
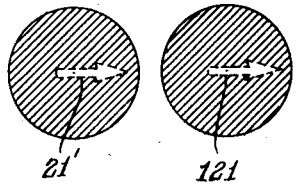

In Fig. 7 the original conditions prevail except that now the lens 13 is fully open and the lens 12 fully closed so that the image of the picture 20 is intercepted and only that of the picture 21 is projected. The latter, which is in a laterally displaced position on its film, is similarly projected as a screen image 121 and at full intensity and gives the illusion of having moved laterally from the position of arrow 20 on the film 14 during the one-half rotation. Thus, during the one-half rotation of the shutter an "after image" is literally placed on the screen serving in still projection in the same manner to supply visual continuity as persistence of vision does in motion picture projection.

I claim:

1. For use in a picture projection apparatus provided with a dual lens dissolve system: a rotatable shutter having an opaque semi-circular portion, with oppositely disposed cut-off edges, one of which is radial and the other parallel to the former and displaced therefrom in a direction opposite to the operative direction of rotation of the shutter.

2. For use in a picture projection apparatus provided with a dual lens dissolve system: a rotatable shutter having an opaque semi-circular portion, with oppositely disposed cut-off edges, one of which is radial and the other parallel to the former and displaced therefrom, in a direction opposite to the operative direction of rotation of the shutter, by the amount of approximately one-fourth the diameter of a lens of said dual lens dissolve system.

ARTHUR E. KROWS.

References Cited in the file of this patent

UNITED STATES PATENTS

| Number | Name | Date |
| --- | --- | --- |
| 1,067,750 | Niles | July 15, 1913 |
| 1,247,646 | Craig | Nov. 27, 1917 |
| 1,259,365 | Cooper | Mar. 12, 1918 |
| 2,142,183 | De Ybarrondo | Jan. 3, 1939 |
| 2,395,883 | Krows | Mar. 5, 1946 |
| 2,460,864 | Whiteley | Feb. 8, 1949 |

FOREIGN PATENTS

| Number | Country | Date |
| --- | --- | --- |
| 378,415 | France | Aug. 9, 1907 |
| 380,436 | Great Britain | Sept. 5, 1932 |